(12) United States Patent
Alperovich et al.

(10) Patent No.: US 6,301,466 B1
(45) Date of Patent: Oct. 9, 2001

(54) SYSTEM AND METHOD FOR OPTIMIZATION OF CALL FORWARDING ON BUSY FOR AN OPTIMIZED MOBILE STATION WITHIN A SATELLITE NETWORK

(75) Inventors: Vladimir Alperovich, Dallas; Eric Valentine, Plano, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/218,967

(22) Filed: Dec. 22, 1998

(51) Int. Cl.[7] ....................................................... H04Q 7/20
(52) U.S. Cl. ........................... 455/12.1; 455/428; 455/433
(58) Field of Search .................. 455/12.1, 11.1, 455/427, 428, 433, 435

(56) References Cited

U.S. PATENT DOCUMENTS

| | | | |
|---|---|---|---|
| 5,506,887 | * 4/1996 | Emery et al. | 379/58 |
| 5,937,352 | * 8/1999 | Courtney et al. | 455/435 |
| 5,953,673 | * 9/1999 | Neubauer et al. | 455/518 |
| 6,014,925 | * 8/2000 | Grube et al. | 455/428 |
| 6,067,452 | * 5/2000 | Alexander | 455/428 |
| 6,138,013 | * 10/2000 | Blanchard et al. | 455/428 |
| 6,138,014 | * 10/2000 | Alperovich et al. | 455/428 |

* cited by examiner

*Primary Examiner*—Daniel Hunter
*Assistant Examiner*—Thuan T. Nguyen
(74) *Attorney, Agent, or Firm*—Jenkens & Gilchrist, P.C.

(57) ABSTRACT

A telecommunications system and method is disclosed for optimizing the Call Forwarding on Busy (CFB) feature for optimized mobile stations (MSs) within a satellite network. The CFB feature for optimized calls can be stored within the Home Location Register (HLR) associated with the MS. Therefore, when the MS becomes engaged in an optimized call, the HLR sets a busy indication associated with the optimized MS. Thereafter, when another incoming call arrives, the HLR can check the busy indication, and if it is set, the HLR determines that the MS is busy, and invokes the CFB feature.

15 Claims, 6 Drawing Sheets

SYSTEM AND METHOD FOR OPTIMIZATION OF CALL FORWARDING ON BUSY FOR AN OPTIMIZED MOBILE STATION WITHIN A SATELLITE NETWORK

BACKGROUND OF THE PRESENT INVENTION

Field of the Invention

The present invention relates generally to telecommunications systems and methods for handling calls within a satellite network, and specifically to optimizing the call forwarding on busy feature for an optimized mobile station within a satellite network.

BACKGROUND AND OBJECTS OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit (one of which is shown) are used to provide communication between Mobile Stations (MS) 20 and a satellite-adapted Base Station System (SBSS) 220, which is connected to an integrated Mobile Switching Center/Visitor Location Register (MSC/VLR) 240. The MS 20 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the MS's 20. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Currently, the terrestrial trunk circuits are leased or owned by the operator, and in some cases, may need to be installed when the satellite network 205 is commissioned. Since the distances within the area served by the satellite(s) 200 are typically very large, the costs for these circuits can be enormous. In particular, the costs can be considerable if the circuits must cross remote areas or oceans.

Thus, as shown in FIG. 3 of the drawings, calls can be optimized using satellite resources by moving a mobile subscribers registration from a serving MSC/VLR 240a to an optimal MSC/VLR 240b. This can be accomplished by sending the Called Party Number (CPN) using, for example, an Unstructured Supplementary Services Data (USSD) string, to a Call Optimization Server (COS) 250 via the serving SBSS 220a and the serving MSC/VLR 240a. The COS 250 performs an analysis on the CPN to determine the optimal MSC/VLR 240b, e.g., the MSC/VLR 240b with either the closest connection to the called subscriber 260 or the MSC/VLR 240b with the least expensive link to the called subscriber 260. Thereafter, the address of the optimal MSC/VLR 240b is returned to the MS 20, which can then register with the indicated MSC/VLR 240b. Once the registration is complete, the MS 20 can send a SETUP message to the new MSC/VLR 240*b* via the new SBSS 220*b*, and the call can be completed.

Once the initial call has been optimized, it is handled by the optimal MSC/VLR 240*b*, which implies that after the initial call has been optimized, all new incoming calls will be routed to that optimal MSC/VLR 240*b*. In addition, in GSM networks, the Call Forwarding on Busy (CFB) feature, which allows incoming calls to be forwarded to another B-number or to a voice mail system when the called MS 20 is busy, e.g., engaged in another call, is handled by the serving MSC/VLR, which, in this case, is the optimal MSC/VLR 240*b*.

For example, if another MS (not shown) served by the original MSC/VLR 240*a* places a call to the optimized MS 20, the original MSC/VLR 240*a* will query the HLR 290 for routing information for the MS 20. The HLR 290 will return the address for the optimal MSC/VLR 240*b*, and the original MSC/VLR 240*a* will send a call setup request to the optimal MSC/VLR 240*b*.

Since the MS 20 is only registered at the optimal MSC/VLR 240*b* during the time that the MS 20 is engaged in the optimized call, the MS 20 will be engaged in the optimized call when the optimal MSC/VLR 240*b* receives the call setup request. At this point, if the MS 20 subscribes to the CFB feature, the optimal MSC/VLR 240*b* will forward the call to the selected end terminal or to the MS's 20 voice mail. This results in an extra call leg to the optimal MSC/VLR 240*b*, which increases the load on the network and may produce unnecessary costs to the calling MS and/or the called MS 20.

It is, therefore, an object of the present invention to optimize the Call Forwarding on Busy feature for optimized mobile stations within a satellite network.

SUMMARY OF THE INVENTION

The present invention is directed to telecommunications systems and methods for optimizing the Call Forwarding on Busy (CFB) feature for optimized mobile stations (MSs) within a satellite network. The CFB feature can be stored within the Home Location Register (HLR) associated with the optimized MS. Therefore, when the MS is engaged in an optimized call, the HLR sets a busy indication associated with the optimized MS. Thereafter, when another incoming call arrives, the HLR can check the busy indication, and if it is set, the HLR determines that the MS is busy, and invokes the CFB feature. Advantageously, by implementing the CFB feature within the HLR for optimized calls, new incoming calls do not need to be first routed to the optimal Mobile Switching Center/Visitor Location Register (MSC/VLR) prior to invoking the CFB feature, which can avoid a potential long distance call connection.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
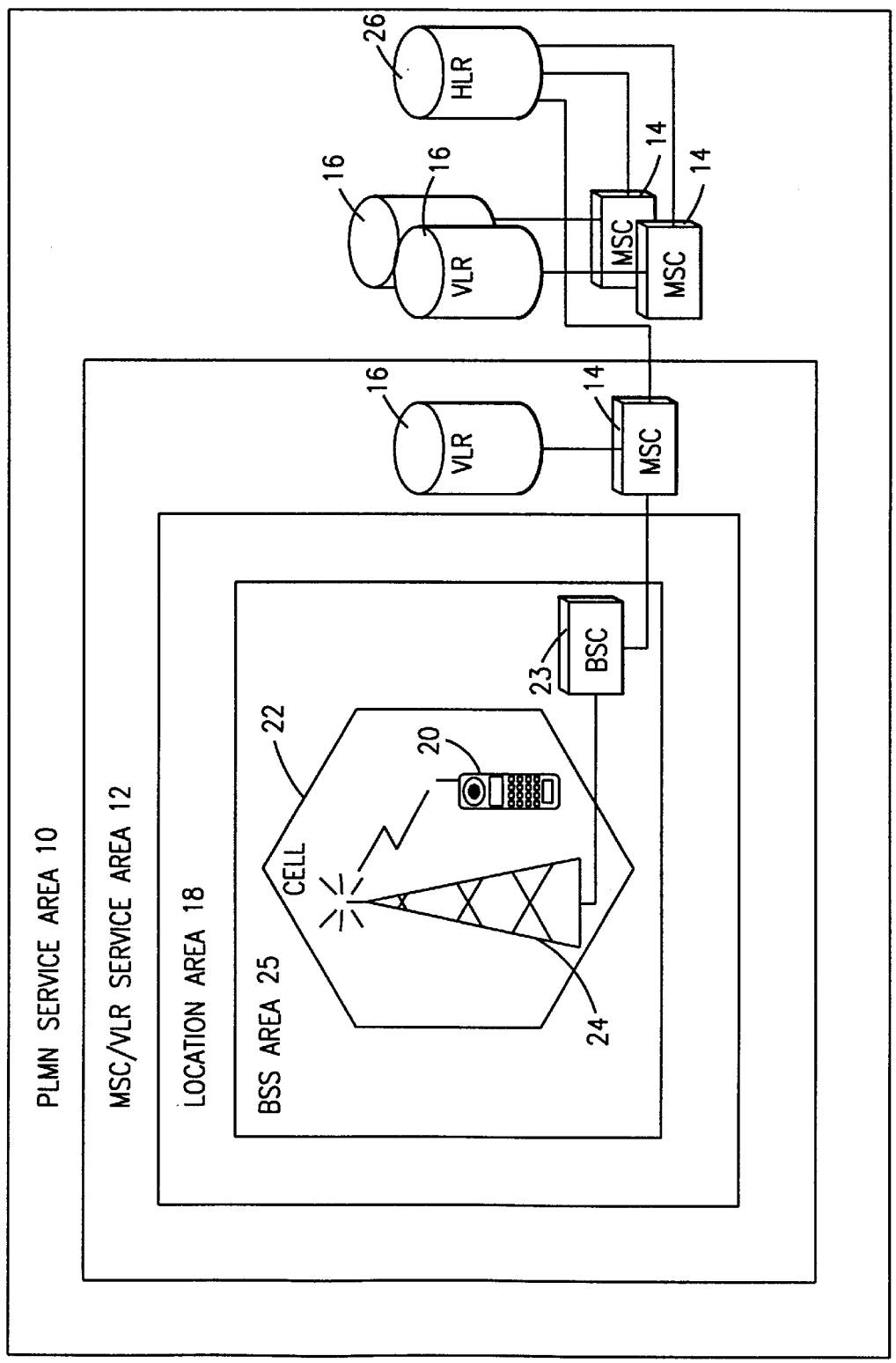
FIG. 1 is a is a block diagram of a conventional terrestrially-based wireless telecommunications system.
Figure 2:
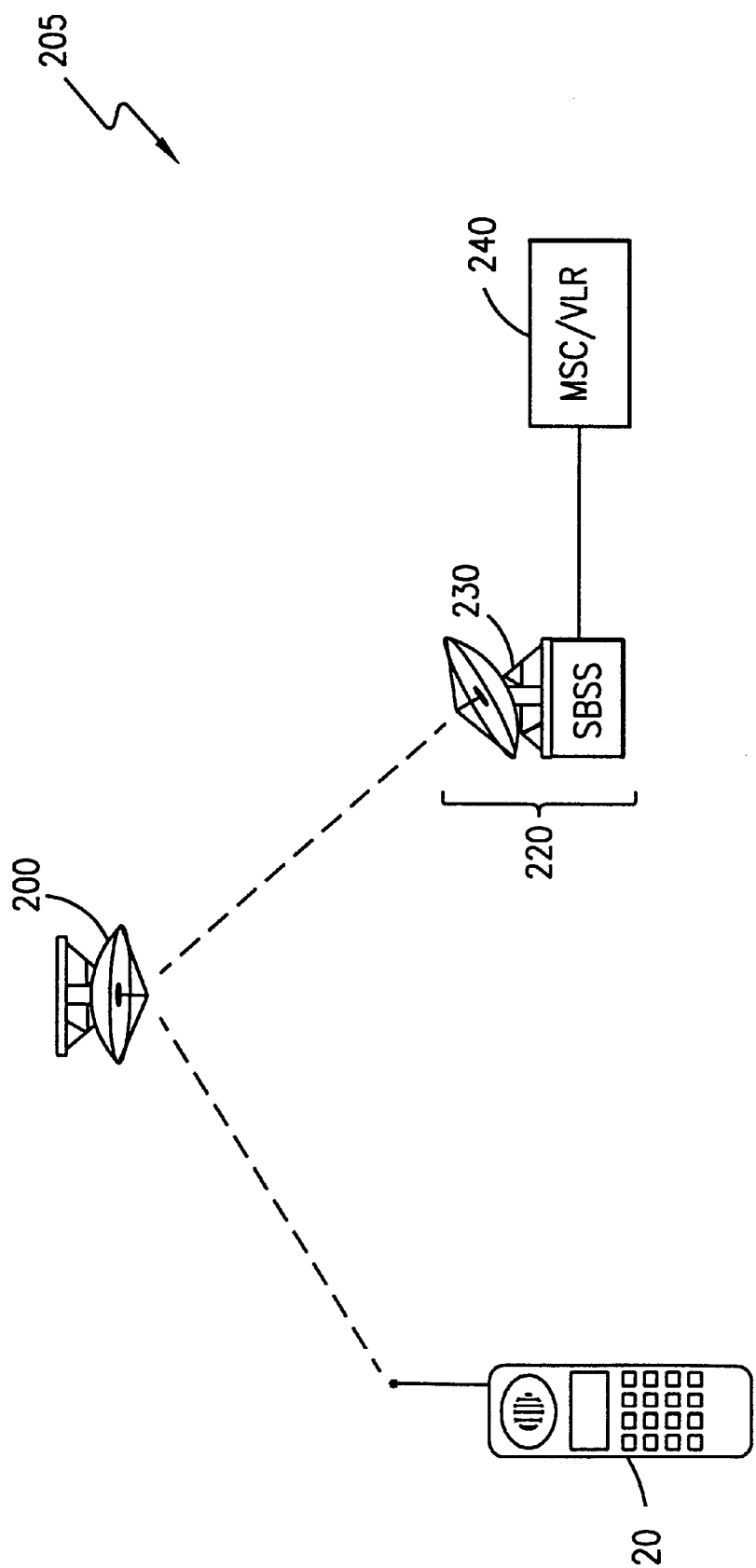
FIG. 2 is a block diagram illustrating aspects of a sample conventional satellite-based telecommunications system.
Figure 3:
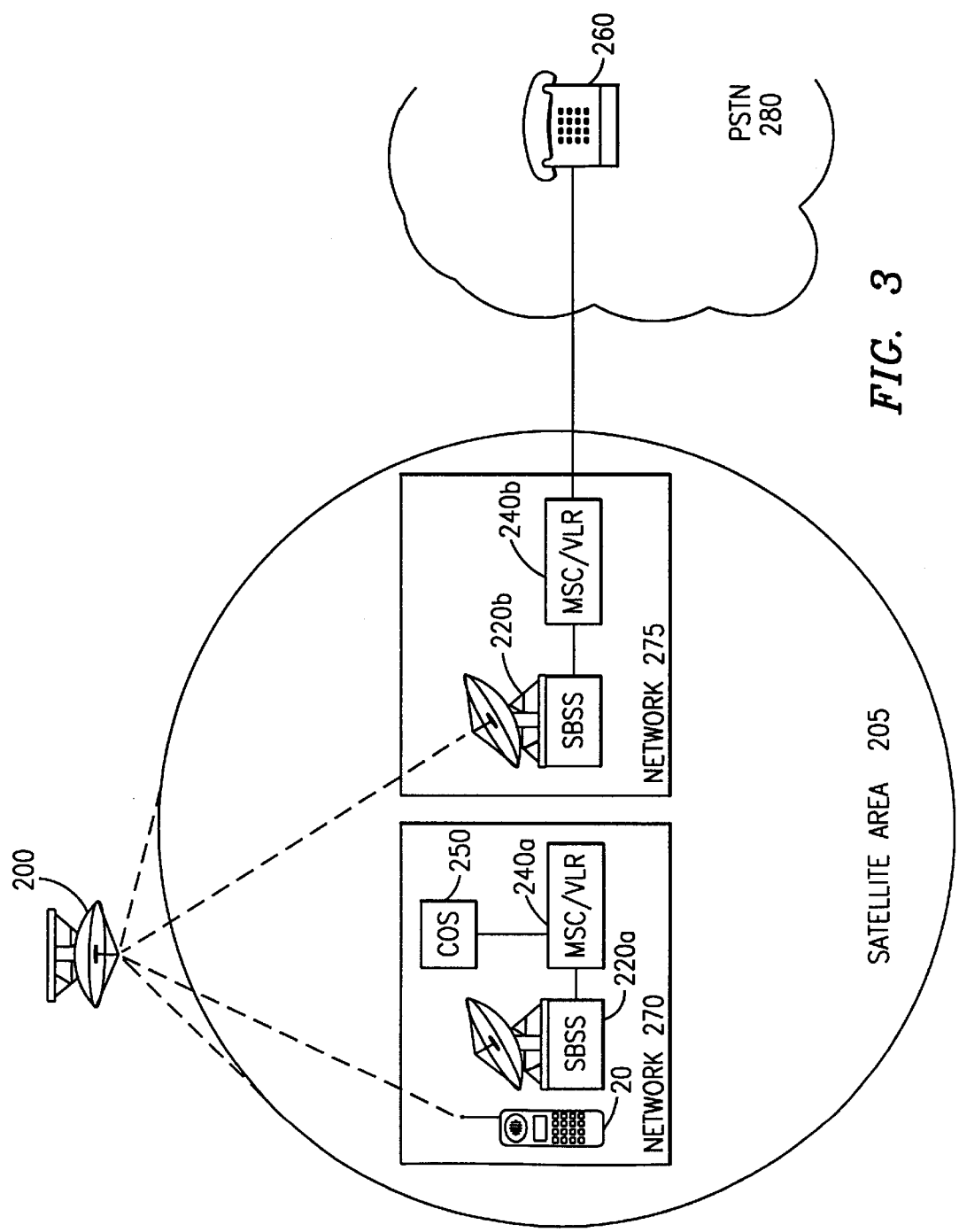
FIG. 3 illustrates the conventional optimization of a call using satellite resources.
Figure 4:
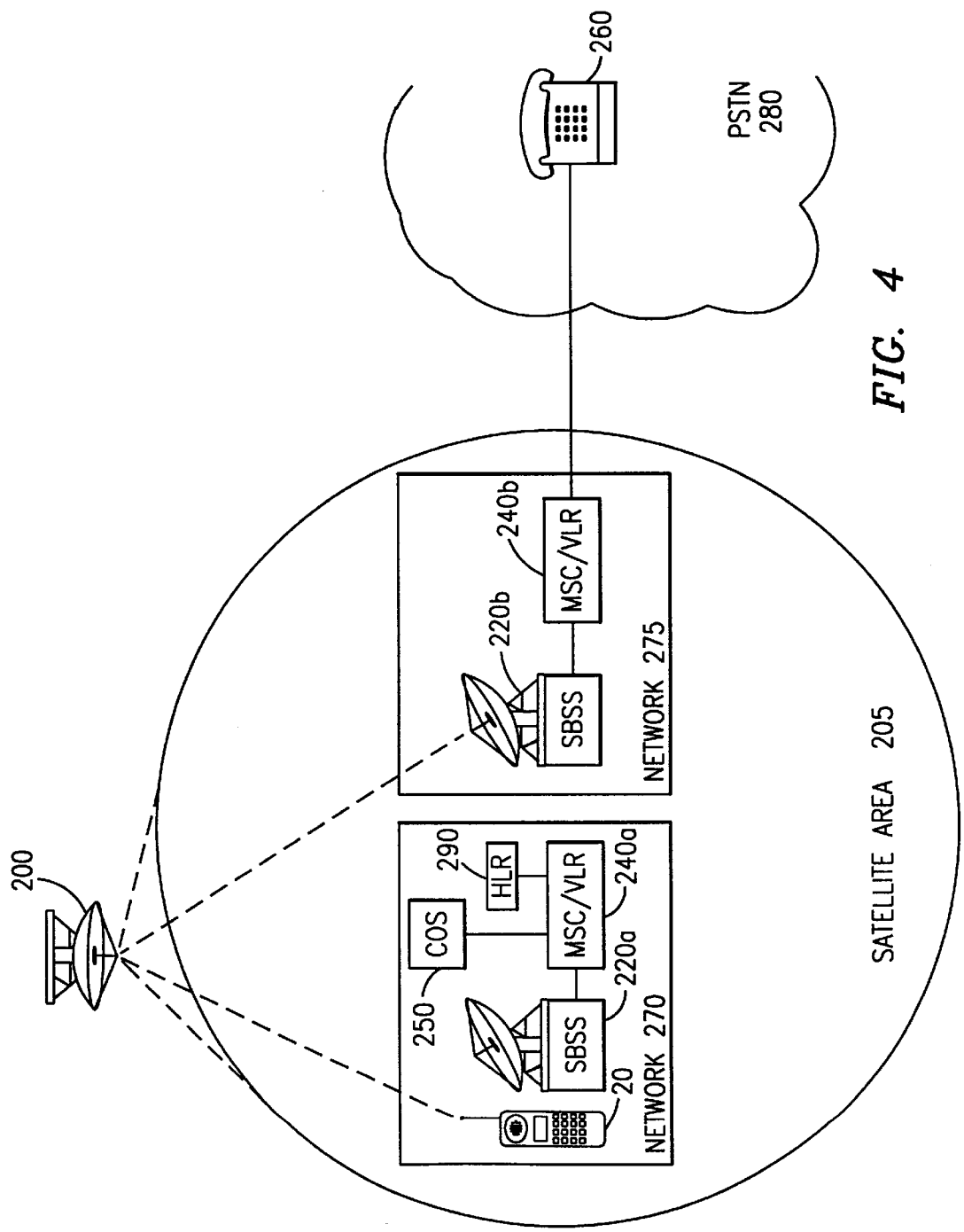
FIG. 4 illustrates the conventional optimization of a call from a mobile station to a fixed subscriber.

A sample optimization process is shown in FIG. 4 of the drawings. Optimization of a call from a Mobile Station (MS) 20 to a called subscriber 260 within the Public Switched Telephone Network (PSTN) 280 (wireline network) can be accomplished by moving the calling MS's 20 registration to an optimal MSC/VLR 240*b* closest to the PSTN 280 of the called subscriber 260. The MS 20 initiates a call to the called subscriber 260 by inputting a Called Party Number (CPN) associated with the called subscriber 260 and transmitting the CPN in an ACCESS REQUEST message on the Random Access Channel (RACH) to a Mobile Switching Center/Visitor Location Register (MSC/VLR) 240*a* serving a first network operator 270 via a satellite 200 and a serving Satellite-Adapted Base Station System (SBSS) 220*a*.

The serving MSC/VLR 240*a* analyzes the CPN and determines that the CPN is not a number registered within the serving MSC/VLR 240*a*. Thereafter, the serving MSC/VLR 240*a* sends the CPN, using, for example, an Unstructured Supplementary Services Data (USSD) string, to a Call Optimization Server (COS) 250 or optimization node, which can be co-located with the serving MSC/VLR 240*a*. Alternatively, it should be noted that the COS 250 could instead be co-located with a Home Location Register (HLR) 290, within the SBSS 220*a* or within an external node (not shown), such as a node within the Intelligent Network. The protocol to the external node could be based on an Intelligent Network (IN), Mobile Application Part (MAP) or other protocol.

The COS 250 performs an analysis on the CPN to determine the destination end office (not shown) of the CPN. Thereafter, the COS 250 determines the optimal MSC/VLR 240*b*, e.g., the MSC/VLR 240*b* within the area 205 visible to the satellite 200 that has the closest connection to the PSTN 280 or the least expensive link to the PSTN 280, and returns the address for this optimal MSC/VLR 240*b* to the MS 20 via the satellite 200, the serving MSC/VLR 240*a* and the serving SBSS 220*a*. The MS 20 attempts to register with the indicated optimal MSC/VLR 240*b* serving a second network operator 275 by sending a Location Update request to the optimal MSC/VLR 240*b* for the purpose of bypassing as much of the terrestrial network as possible. Alternatively, the Location Update request can be sent by the serving SBSS 220*a* to the optimal MSC/VLR 240*b* instead of being sent by the calling MS 20. It should be understood that the optimal MSC/VLR 240*b* could serve another area within the same network 270 as the serving MSC/VLR 240a, instead of being located within another network 275.

The optimization occurs when the MS 20 sends a SETUP message to the new optimal MSC/VLR 240b via the satellite 200 and the new optimal SBSS 220b, as is understood in the art. The call can then be completed normally using minimal terrestrial circuits and existing satellite resources. When the call is finished, the MS 20 is re-registered at the original serving MSC/VLR 240a. This re-registration is necessary for a number of commercial, regulatory and technical reasons.

Thereafter, when another new incoming call is placed to the optimized MS 20 during the optimized call, the new incoming call is routed to the optimal MSC/VLR 240b. Since the optimized MS 20 is engaged in the optimized PSTN call, the optimal MSC/VLR 240b will activate a Call Forwarding on Busy (CFB) feature for the optimized MS 20, which instructs the optimal MSC/VLR 240b to route the new incoming call either to another end terminal or to a voice mail system associated with the optimized MS 20. For example, if the new incoming call is initiated by another MS (not shown) served by the original MSC/VLR 240a, a long-distance leg must be established between the original MSC/VLR 240a and the optimal MSC/VLR 240b prior to determining that the optimized MS 20 is busy and the call must be forwarded. This long-distance leg can be expensive for both the calling and called parties. Thus, sub-optimal routing of new incoming calls to the MS 20 after that MS 20 has been re-registered to an optimal MSC/VLR 240b can occur during the time that the MS 20 is registered with that optimal MSC/VLR 240b.

Figure 5:
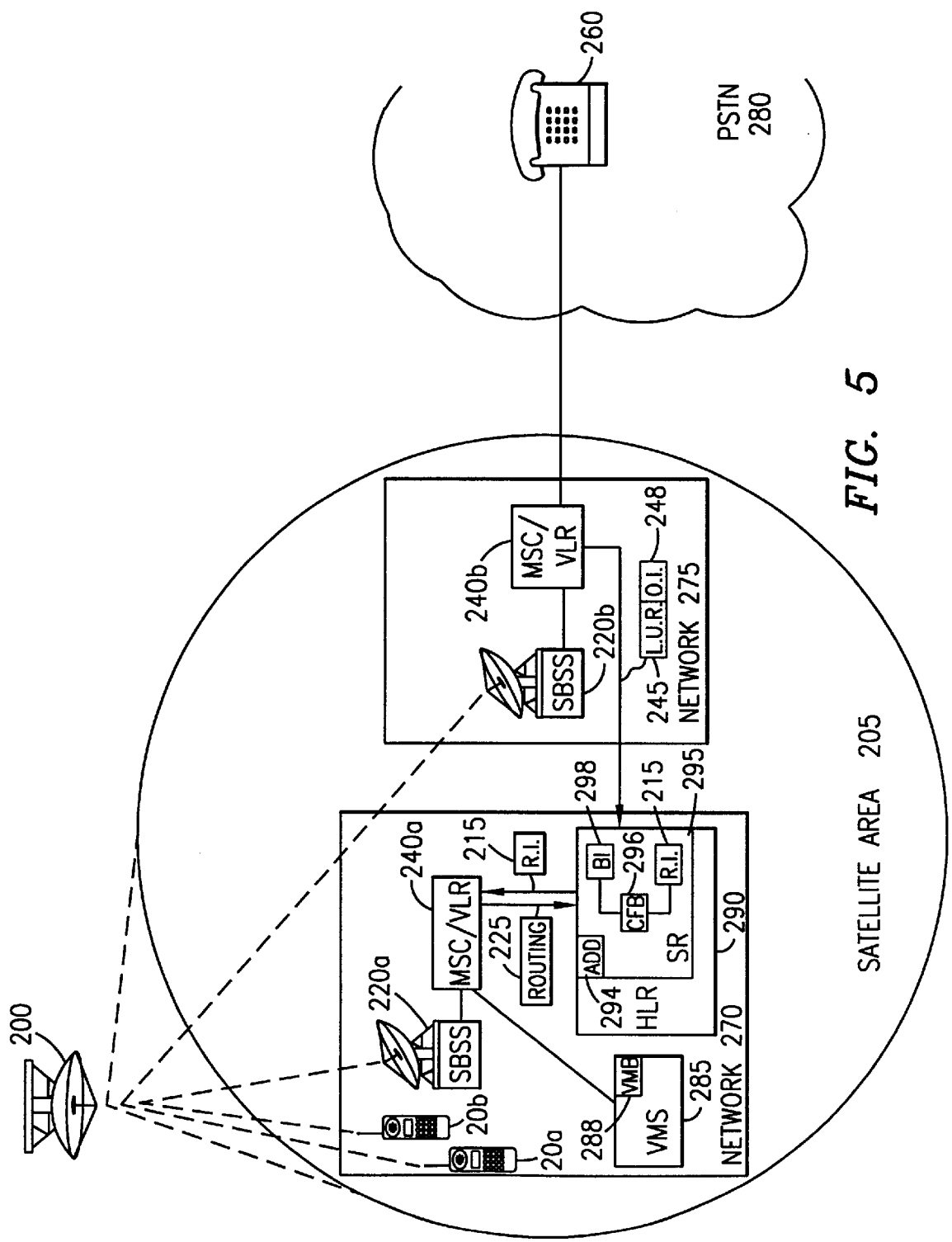
FIG. 5 illustrates the implementation of a Call Forwarding on Busy (CFB) feature within a Home Location Register (HLR) associated with an optimized mobile station in accordance with preferred embodiments of the present invention.
Figure 6:
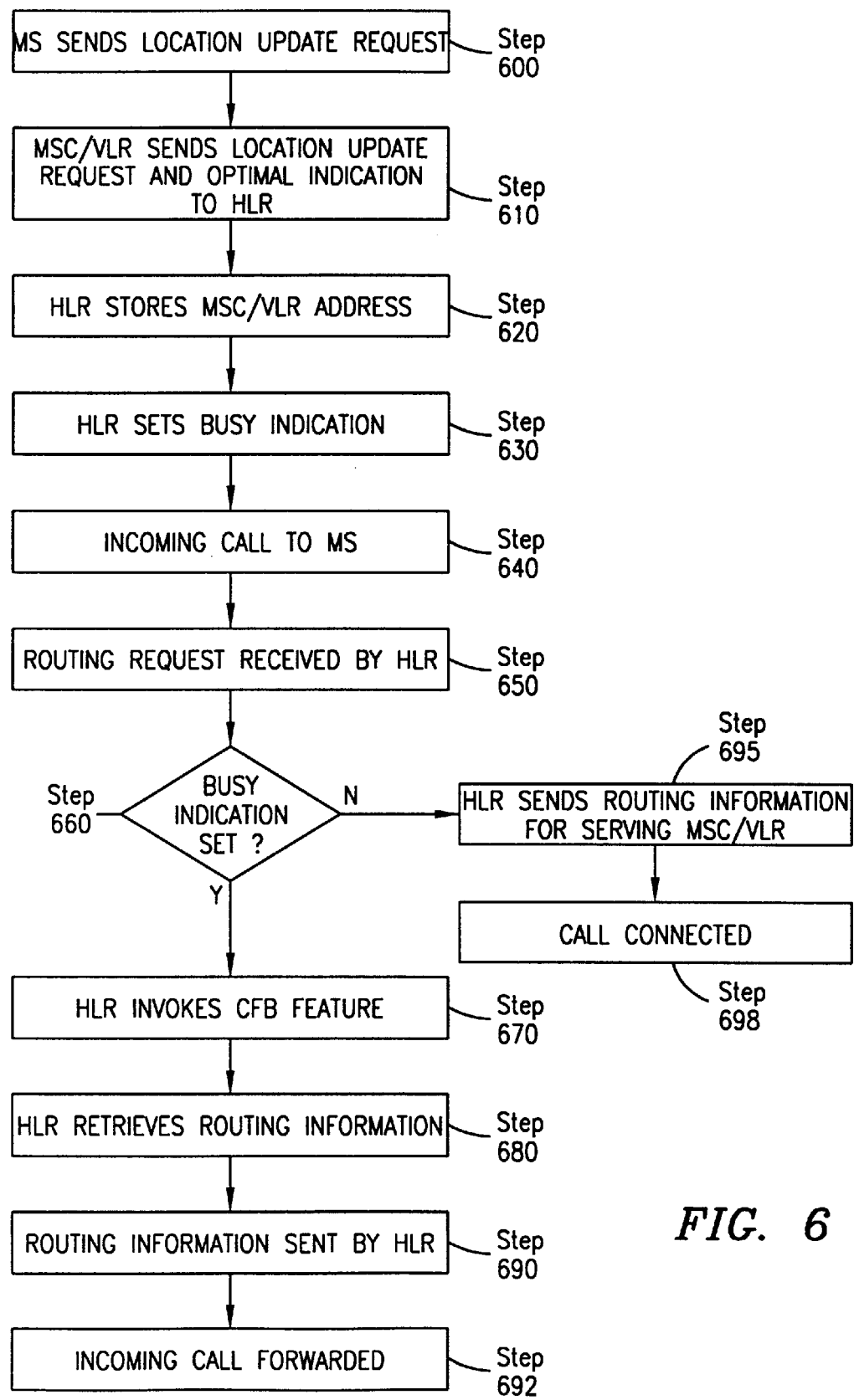
FIG. 6 shows steps in a sample implementation of the CFB feature for optimized calls.

With reference now to FIG. 5 of the drawings, which will be described in connection with the steps illustrated in FIG. 6 of the drawings, in accordance with preferred embodiments of the present invention, when the MS 20a sends a Location Update request 245 to the optimal MSC/VLR 240b (step 600), the optimal MSC/VLR 240b forwards the Location Update request 245 along with an optimization indication 248 to the HLR 290 (step 610). The optimization indication 248 informs the HLR 290 that the Location Update request 245 is for an optimized call and not because the MS 20a has moved to the network 275 covered by the optimal MSC/VLR 240b. The HLR 290 stores an address 294 for the optimal MSC/VLR 240b in a subscriber record 295 associated with the MS 20a (step 620) and sets a busy indication 298 due to optimization associated with the MS 20a (step 630), which marks the MS 20a as busy for the duration of the optimized call.

This busy indication 298 allows the HLR 290 to invoke a CFB feature 296 associated with the MS 20a. Normally, the CFB feature 296 can only be invoked by the serving MSC/VLR 240b, because the serving MSC/VLR 240b must usually make the determination as to whether the called MS 20a is busy. However, since the optimal MSC/VLR 240b included the optimization indication 248 along with the Location Update request 245, the HLR 290 realizes that the MS 20a is engaged in a call. Alternatively, the CFB feature 296 due to optimization can be a separate feature than the regular CFB feature.

Thereafter, when a calling party, shown in FIG. 5 as a calling MS 20b, places a call to the optimized MS 20a (step 640), the MSC/VLR 240a serving the calling MS 20b, which in this case, is also a Gateway MSC/VLR 240a, but is referred to as MSC/VLR 240a, sends a routing request 225 to the HLR 290 for routing information for the called MS 20a (step 650). It should be understood that the calling party can be located anywhere within the satellite area 205 or within the PSTN 280 or any other PSTN. If the calling party is within the PSTN 280, the call is first routed to a Gateway MSC (GMSC) (not shown) serving the satellite area 205. This GMSC sends the routing request 225 to the HLR 290 and forwards the call accordingly.

In response to the routing request 225 (step 650), the HLR 290 accesses the subscriber record 295 associated with the called MS 20a, and if the busy indication 298 stored in the subscriber record 295 is set (step 660), in order to prevent sub-optimal routing of the new incoming call, the HLR 290 invokes the CFB feature 296 associated with the called MS 20a (step 670). When the HLR 290 invokes the CFB feature 296 (step 670), the HLR accesses the subscriber record 295 to retrieve routing information 215 for either an alternative end terminal (not shown) or a local voice mail box 288 of a local voice mail system 285 associated with the called MS 20a (step 680), and returns this routing information 215 to the original MSC/VLR 240a (step 690).

Thereafter, the MSC/VLR 240a can forward the incoming call to the alternative end terminal or the called MS's 20a voice mail box 288 using the routing information 215 (step 692). If the call is to be forwarded to another end terminal, the HLR 290 will return the B-number of the end terminal, and the original MSC/VLR 240a will route the call to the alternative end terminal based upon this B-number. For example, if the returned B-number is to another MS (not shown), the original MSC/VLR 240a will query the HLR (not shown) associated with this returned B-number for further routing information. Advantageously, by implementing the CFB feature within the HLR for optimized calls, new incoming calls do not need to be first routed to the optimal Mobile Switching Center/Visitor Location Register (MSC/VLR) prior to invoking the CFB feature, which can avoid a potentially long distance call connection.

However, if the busy indicator 298 is not set (step 660), e.g., the called MS 20a is no longer involved in an optimized call and has been re-registered at the original MSC/VLR 240a, the HLR 290 returns routing information 215 for the serving MSC/VLR 240a (step 695). The original MSC/VLR 240a can connect the call between the calling MS 20b and the called MS 20a using this routing information 215 (step 698).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A home location register within a satellite network, comprising:

a subscriber record associated with a mobile station;

a busy indication within said subscriber record responsive to an indication that said mobile station has been optimized, said optimized mobile station being registered with an optimal mobile switching center via a satellite for an optimized call, said optimized mobile station being located in a geographical area different than the geographical area served by said optimal mobile switching center;

means for receiving a routing request for an incoming call to said mobile station from a requesting node;

a call forwarding on busy feature associated with said mobile station for forwarding calls made to said mobile station to a predetermined location when said mobile station is busy; and means for invoking said call forwarding on busy feature responsive to said routing request and said busy indication being set.

2. The home location register of claim 1, wherein said busy indication is set in response to an optimization indication within a location update request received from said optimal mobile switching center serving said mobile station.

3. The home location register of claim 1, wherein said call forwarding on busy feature comprises routing information for an end node.

4. The home location register of claim 3, further comprising:

means for sending said routing information to said requesting node in response to said routing request when said busy indication is set.

5. A method for optimizing a call forwarding on busy feature associated with a mobile station within a satellite network, comprising the steps of:

setting, by a home location register associated with said mobile station, a busy indication associated with said mobile station stored within said home location register when said mobile station is optimized, said optimized mobile station being registered with an optimal mobile switching center via a satellite for an optimized call, said optimized mobile station being located in a geographical area different than the geographical area served by said optimal mobile switching center;

receiving, by a switch, an incoming call to said mobile station from a calling party;

sending a routing request based upon said received incoming call from said switch to said home location register;

checking said busy indication in response to said received routing request; and if said busy indication is set, invoking, by said home location register, said call forwarding on busy feature.

6. The method of claim 5, wherein said step of setting further comprises the steps of:

sending an optimization indication within a location update request from said optimal mobile switching center to said home location register; and setting, by said home location register, said busy indication based upon said optimization indication.

7. The method of claim 6, further comprising the steps of:

terminating said optimized call by said mobile station; and registering, by said mobile station, at an original mobile switching center serving the geographical area that said mobile station is located in.

8. The method of claim 7, further comprising the step of:

in response to said step of registering, resetting, by said home location register, said busy indication associated with said mobile station to indicate said mobile station is no longer optimized.

9. The method of claim 5, further comprising the step of:

sending routing information from said home location register to said switch in response to said routing request when said call forwarding on busy feature indicates said mobile station is optimized.

10. The method of claim 9, further comprising the step of:

forwarding said incoming call from said switch to a voice mail box associated with said mobile station within a voice mail system using said routing information.

11. A method for optimizing a call forwarding on busy feature associated with a mobile station within a satellite network, comprising the steps of:

receiving an incoming call to said mobile station;

determining whether a busy indication associated with said mobile station is set at a home location register associated with said mobile station, said busy indicated being set when said mobile station is registered with an optimal mobile switching center via a satellite for an optimized call, said optimized mobile station being located in a geographical area different than the geographical area served by said optimal mobile switching center;

if said busy indication is set, forwarding said incoming call to a predetermined location; and if said busy indication is not set, forwarding said incoming call to a mobile switching center serving the geographical area that said mobile station is located in.

12. The method of claim 11, wherein said step of determining further comprises the steps of:

sending an optimization indication within a location update request from said optimal mobile switching center to said home location register; and setting, by said home location register, said busy indication based upon said optimization indication.

13. The method of claim 12, wherein said step of determining further comprises the steps of:

terminating said optimized call by said mobile station;

registering, by said mobile station, at an original mobile switching center serving the geographical area that said mobile station is located in; and in response to said step of registering, resetting, by said home location register, said busy indication associated with said mobile station to indicate said mobile station is no longer optimized.

14. The method of claim 11, wherein said step of forwarding said incoming call to said predetermined location further comprises the steps of:

sending routing information for a voice mail box associated with said mobile station within a voice mail system from said home location register to a requesting switch; and connecting said incoming call from said switch to said voice mail box using said routing information.

15. The method of claim 11, wherein said step of forwarding said incoming call to said mobile switching center further comprises the steps of:

sending routing information for said mobile switching center from said home location register to a requesting switch; and connecting said incoming call from said switch to said mobile station via said mobile switching center using said routing information.

* * * * *